United States Patent
Regenscheit

(10) Patent No.: US 7,395,728 B2
(45) Date of Patent: Jul. 8, 2008

(54) POWERSHIFT GEARBOX FOR CONSTRUCTION MACHINES, ESPECIALLY FOR A TRACTOR BACKHOE LOADER AND A TELESCOPIC HANDLER

(75) Inventor: Norman Regenscheit, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 331 days.

(21) Appl. No.: 10/561,693

(22) PCT Filed: Jun. 7, 2004

(86) PCT No.: PCT/EP2004/006121

§ 371 (c)(1),
(2), (4) Date: Jan. 17, 2006

(87) PCT Pub. No.: WO2005/003592

PCT Pub. Date: Jan. 13, 2005

(65) Prior Publication Data

US 2006/0196286 A1    Sep. 7, 2006

(30) Foreign Application Priority Data

Jul. 4, 2003   (DE) ................... 103 30 159

(51) Int. Cl.
*F16H 3/08*   (2006.01)
*F16H 37/06*  (2006.01)

(52) U.S. Cl. .................... 74/331; 74/665 GA
(58) Field of Classification Search ........... 74/325, 74/329, 330, 331, 333, 665 R, 665 F, 665 G, 74/665 GA
See application file for complete search history.

(56) References Cited

U.S. PATENT DOCUMENTS

| 4,245,519 | A | * | 1/1981 | Herlitzek ................. 74/331 |
| 4,549,443 | A |   | 10/1985 | White |
| 5,063,793 | A | * | 11/1991 | McAskill ................. 74/360 |
| 5,249,475 | A | * | 10/1993 | McAskill ................. 74/331 |
| 5,743,142 | A | * | 4/1998 | Leber et al. ............. 74/331 |
| 5,819,587 | A |   | 10/1998 | Leber et al. |
| 6,513,399 | B2 | * | 2/2003 | Lamela .................. 74/331 |
| 6,752,034 | B2 |  | 6/2004 | Huber et al. |
| 6,988,426 | B2 | * | 1/2006 | Calvert .................. 74/331 |

(Continued)

FOREIGN PATENT DOCUMENTS

DE    35 21 932 A1    1/1987

(Continued)

*Primary Examiner*—Roger Pang
(74) *Attorney, Agent, or Firm*—Davis Bujold & Daniels, P.L.L.C.

(57) ABSTRACT

A multi-geared high-low clutch for construction machines and telescopic handlers, with a torque converter, a drive shaft, an output shaft and several jack shafts, with distributed idlers on the shafts, fixed wheels and shift clutches, which form several reduction gear units for the gearshift and direction circuit, containing six forward gears and three reverse gears, whereby output shaft is also used as a jack shaft for a gear, with which the corresponding jack shaft of forward gear unit and the corresponding jack shaft of a further forward gear unit engages with drive shaft. Both jack shafts can be rotated around drive shaft, where corresponding jack shafts of the gears, applied to drive shaft, are arranged one behind the other on a side of the drive shaft and where the corresponding jack shafts of the further gears, can currently be rotated around the next jack shaft.

13 Claims, 6 Drawing Sheets

U.S. PATENT DOCUMENTS

2003/0015050 A1* 1/2003 Huber et al. .................. 74/331
2003/0131686 A1* 7/2003 Huber ......................... 74/664

FOREIGN PATENT DOCUMENTS

| DE | 44-16 930 A1 | | 11/1995 |
| DE | 101 31 329 A1 | | 1/2003 |
| WO | WO9415116 | * | 7/1994 |
| WO | WO-95/31654 | | 11/1995 |
| WO | WO-02/097301 A1 | | 12/2002 |

* cited by examiner

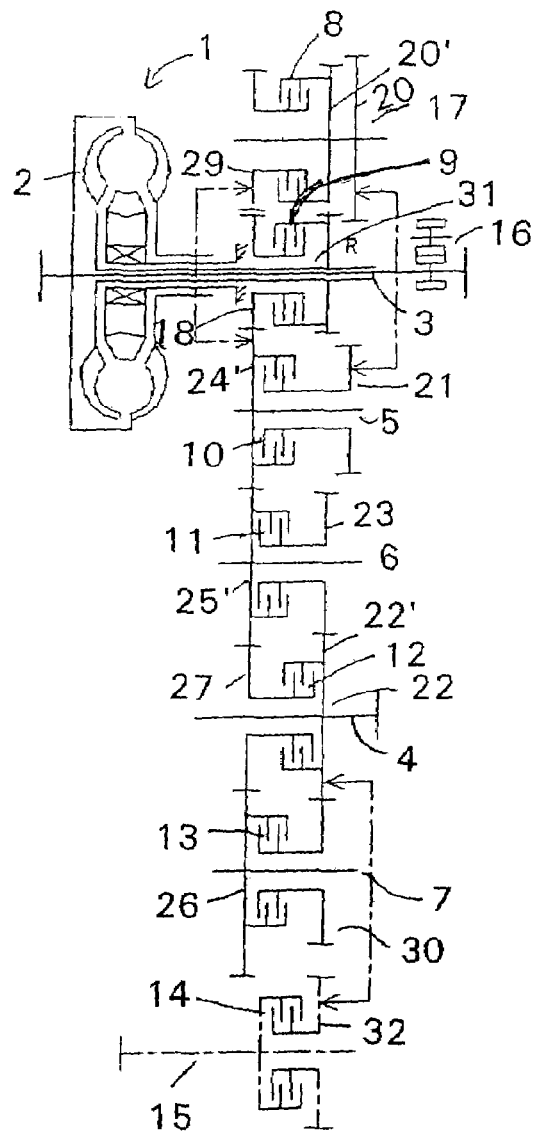
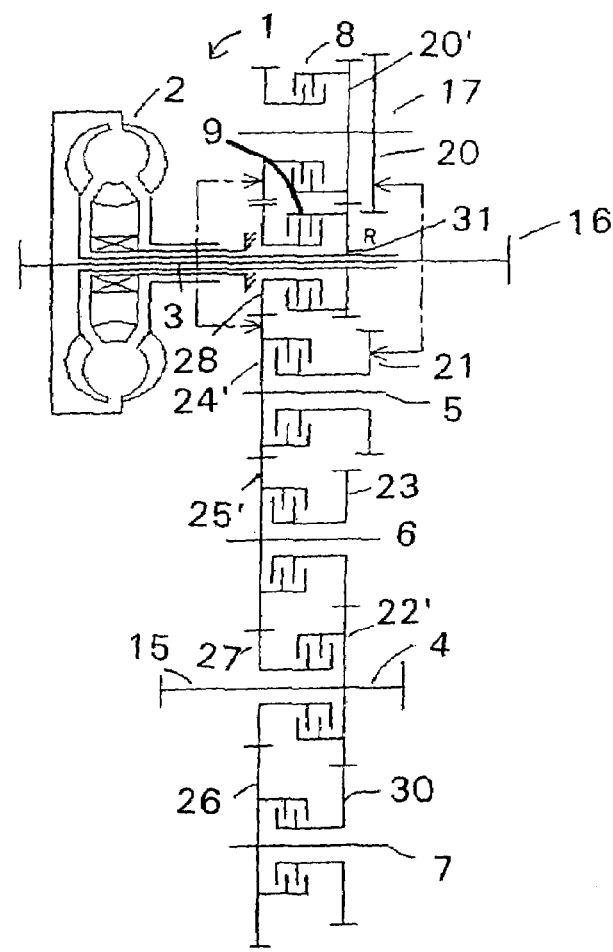
Fig. 1
Fig. 2

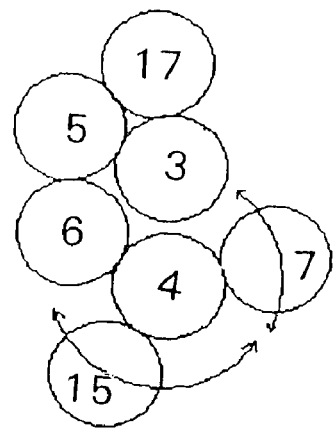
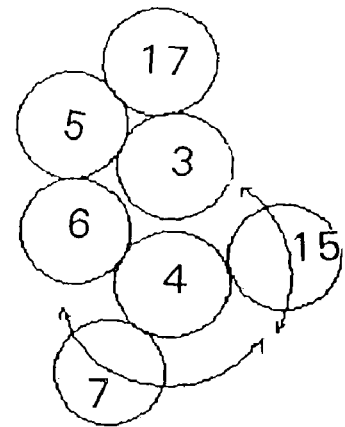
Fig. 11A                    Fig. 11B
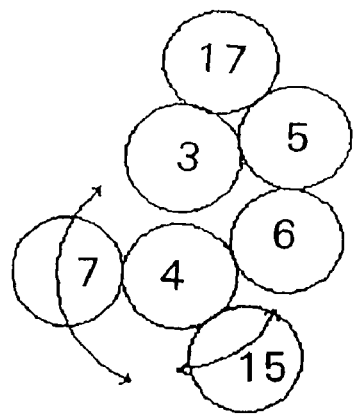
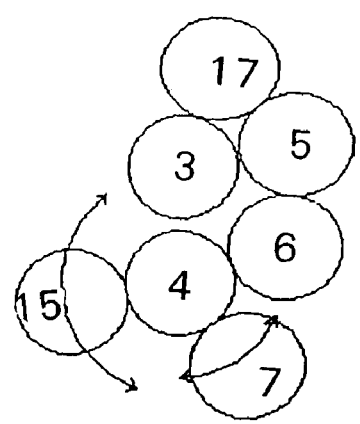
Fig. 11C                    Fig. 11D

POWERSHIFT GEARBOX FOR CONSTRUCTION MACHINES, ESPECIALLY FOR A TRACTOR BACKHOE LOADER AND A TELESCOPIC HANDLER

This application is a national stage completion of PCT/EP2004/006121 filed Jun. 7, 2004 which claims priority from German Application Serial No. 103 30 159.3 filed Jul. 4, 2003.

FIELD OF THE INVENTION

The present invention concerns a powershift gearbox for construction machines, especially for a tractor backhoe loader and a telescopic handler.

BACKGROUND OF THE INVENTION

Such gear systems are usually implemented as reverse gear units and are fitted in many different construction machines, whereby the installation conditions, as a function of the type of motor vehicle, can fail differently. For example, the available fitting space, if it is extremely small, can fail. Furthermore, different axle bases between the transmission drive shaft and the transmission output shaft can occur; besides, depending on the type of motor vehicle, a certain axle placement between the entrance shaft and the output shaft of the gear system is necessary.

An excavator loader vehicle demands, for example, a compact building method due to the central installation and the clearance. A motor vehicle telescopic handler demands a slim, tall silhouette with small lateral discharges or a low building method with the possibility of the lateral expansion upon execution.

Further, in most areas of application in construction machines, at least one auxiliary drive is needed for the hydraulics of the machine, for example. The tasks, which a reverse gear unit has to fulfill, are therefore conditional by the design of the type of motor vehicle and are very different. These requirements must be fulfilled within the overall axial length and width of the transmission.

Transmissions of the kind initially specified have different requirements regarding the positions of the drive shafts and the number of the necessary forward and reverse gears.

For example, excavator loader transmissions have requirements regarding a short distance between the output shaft and the drive shaft (to the rear wheels), which is conditional to the position by the fitting space in the vehicle. Further, it should be given as much clearance as possible, which means that the engine/gear unit should sit as high as possible. With excavator loaders, in most cases, the rear wheels are clearly larger than the front wheels, whereby the vertical position of the rear axle is clearly higher than that of the front axle. Typical distances, which result, are 160-180 millimeters in the vertical direction without lateral misalignment or with a small lateral misalignment.

Excavator loaders usually exhibit an insertable front wheel drive, whereby the front wheel drive lies lower to the rear wheels due to the smaller front wheels at the transmission opposite the drift. Since the engine surface mounting is also on the front side of the transmission, there is the restriction of the building space in which the front wheel drive is arranged outside, respectively below, a converter bell.

The telescopic handler have a permanent four wheel drive. The front wheel drive is in the same position as the rear drift, whereby the transmission needs only one drive shaft. In addition to the body of the vehicle, the gears of the telescopic handlers have other requirements regarding the axle base than the excavator loader transmissions. In many cases, for example, a large lateral misalignment of the drift is necessary for drive. This demand results from the lateral installation position of the engine. Thus, a horizontal misalignment is necessary for the centric drive shaft. The bypass of the current force to the middle of the vehicle was, in most cases until now, achieved by the installation of an axle distributor gear.

A further typical installation position is possible for the centric arrangement of the gear/motor unit with telescopic handlers with a lateral construction. Here it may provide no lateral misalignment of the drift (related to the propulsion); the vertical wheel base is clearly larger opposite a telescopic handler with a transfer case, as well as opposite a gear system of an excavator loader.

From EP 0 759 129 B1 an announcement of a read-adjustable reverse gear unit is known, which exhibits a drive wheel set and a distributor wheel set in the allocation of coupling shift clutches, fixed wheels and idlers on several forward shafts, with which long and short axle bases can be realized. For long axle bases, it is proposed that the jack shafts are essential in the ordering of the drive shaft and the drive shaft, whereby, depending upon the desired gear, different combinations of jack shafts are involved in power transmission. With short axle bases, the jack shafts are positioned in a circle around the drive shaft, which is how their position to each other is already determined. With this reverse gear, different shaft arrangements are proposed for the realization of different axle bases.

Furthermore, in DE 101 31 329, a read-adjustable, more usual reverse gear unit was announced with a drive shaft, an output shaft and several jack shafts with on these idlers distributed on the shafts, fixed wheels and coupling shift clutches, which form several reduction gear units at the gearshift and direction circuit. Here the individual waves are combined into a reverse gear unit and a transmission unit, whereby the transmission unit, at any side of the drive, is proposed and the transmission unit is attached to the reverse gear unit, so that the reverse transmission unit and the transmission unit are behind each other on the drive shaft and organized on a side of the drive shaft.

With the transmission concepts being the state of the art, the axle base cannot variably arranged in an unfavorable way. Due to the clutch and shaft arrangement, as well as the engages of certain wheels, they exist with each other in a small space concerning the positioning of the wheel base (drive to drift). Often a construction modification is in order to be able to meet changed requirements to the axle base, only at the highest possible cost, which means that for the realization of different axle bases, different transmission concepts must be developed.

For example, with existing transmission concepts, it is necessary to introduce an intermediate shaft in order to come from a short vertical axle base to a large axle base. In order to obtain a large lateral misalignment, a transfer case must be cultivated.

The existing diagrams exhibit the disadvantage that the outward transmission for is only conditionally, flexibly shaped. Thus it is often impossible to satisfy a transmission concept of the requirements to the available space of the various types of motor vehicles.

Moreover, many of the usual kinds of transmissions do not exhibit the necessary flexibility, especially modularity, in order to correct the different requirements of the numbers of threads in a transmission concept. For the realization of these different numbers of threads, complex re-designs are often necessary. With some gear construction methods, it is possible, by "taking" a clutch from a 5-gear or a 6-gear transmission, to make it suitable for a 4-gear transmission. However, this does not result in a significant reduction in cost, since the concept for a 6-gear transmission is laid out.

The present invention is based on the task of creating a powershift gearbox for construction machines, especially for a tractor backhoe loader and a telescopic handlers, a task which circumvents the disadvantages of the state of the art. In particular, very small and very large axle bases are made possible. Moreover, the possible shaft arrangements of the different requirements are supposed to satisfy excavator loader transmissions and telescopic handler transmissions.

SUMMARY OF THE INVENTION

A read-adjustable, multi-geared, reverse gear unit with a drive shaft, an output shaft and several jack shafts with idlers distributed on the shafts, fixed wheels and shift clutches, which form several reduction gear units to the gearshift and direction circuit, is suggested with which of a forward gear unit (direction unit) corresponding jack shafts and a further forward gear unit (direction unit) engage corresponding jack shafts with the drive shaft, whereby the jack shafts, which engage with the drive shaft, in which each desired angle position is able to rotate around the drive shaft.

According to the invention, the gears of the corresponding jack shafts are arranged in relation to the drive shaft, one behind the other on a side of the drive shaft.

In a favorable way, the gears of corresponding jack shafts can currently be rotated around the next spatially visible ordered jack shaft, which is in the direction of the drive shafts in a large angle area. Therefore, almost every building form can be realized, whereby the transmission of the requirements for excavator loader transmissions and for telescopic handler transmissions, which is proposed in this invention, is sufficient. This transmission primarily covers six forward and three reverse gears.

The position of the front wheel drive can be variably arranged in accordance with this invention, since the front wheel drive in a large angle window can be arranged around the drift. For an excavator loader, front wheel drive can be variable inserted; for a telescopic handler transmission, the drift is united to the rear and forward in a shaft.

BRIEF DESCRIPTION OF THE DRAWINGS

The invention will now be described, by way of example, with reference to the accompanying drawings (the same reference symbols correspond to the same constructions units) in which:

FIG. 1 is a kinematic diagram of an initial embodiment of the transmission proposed by this invention;

FIG. 2 is a kinematic diagram of a second embodiment of the transmission proposed by this invention;

FIGS. 9, 10A, 10B, 11A, 11B, 11C and 11D are drawings of the shaft arrangement for different embodiments of the transmission proposed by this invention.

DETAILED DESCRIPTION OF THE INVENTION

Figure 3:
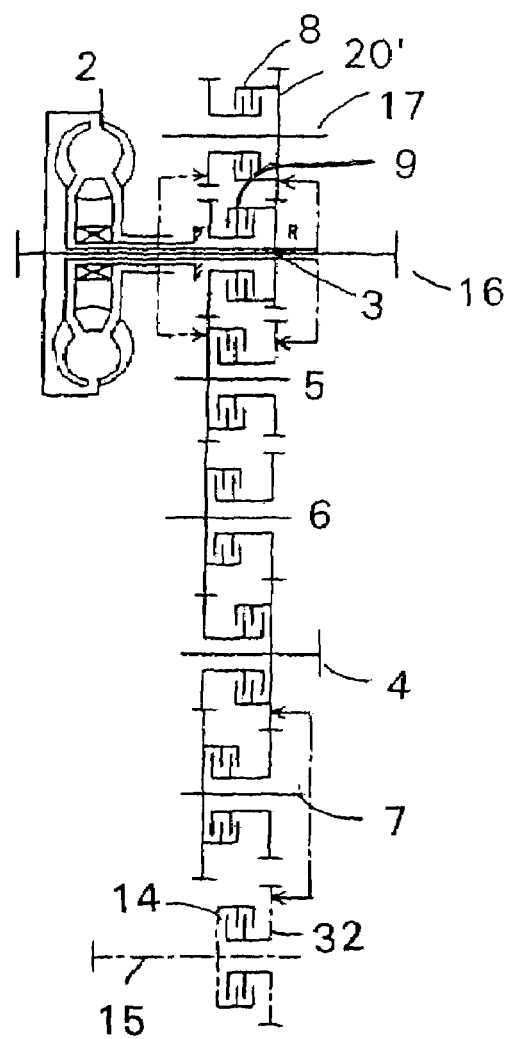
FIGS. 3 to 7 are a further kinematic diagrams of a transmission proposed by the present invention.

In FIG. 1, a read-adjustable, multi-geared reverse gear transmission 1 is shown, which has six forward gears and three reverse gears, with a torque converter 2, a drive shaft 3, an output shaft 4 and several jack shafts 5, 6, 7, 17 with these idlers distributed on the shafts, fixed wheels and shift clutches 8, 9, 10, 11, 12, 13, which form several reduction gear units for the gearshift and direction circuit. Here the shift clutches 8 and 10 will be inserted as forward clutches; the rear clutch is provided with reference symbol 9. Furthermore, according to the transmission proposed in this invention, a separate, insertable front wheel drive 15 is proposed over shift clutch 14, which is to be connected to a fixed wheel 22 of output shaft 4 over an idler 32, whereby this diagram is suitable for installation in excavator loaders in particular.

As can be derived from FIG. 1, an auxiliary drive is proposed, for example PTO 16, which is primarily connected to the drive shaft 3.

The corresponding jack shaft 17 of a forward gear unit and the corresponding jack shaft 5 of the further forward gear unit engage with the drive shaft 3; both jack shafts are able to be rotated around drive shaft 3 in every desired angle position.

In accordance with the invention, the shaft 6 can be rotated around shaft 5 in a very large angle area. In addition, the output shaft 4 can also be rotated around shaft 6 in a large angle area; also shaft 7 can also be rotated, in a large angle area around output shaft 4. According to the concept as proposed in the invention, the transmission form can adapt to the building space conditions, as well as to the requirements of various construction machine types.

The drive shaft 3 engages with shafts 17 and 5; for this purpose, it is connected by a fixed wheel 31 with a fixed wheel 20' of shaft 17 and by shift clutch 8 and an idler 28 with a fixed wheel 24' of shaft 5. Shaft 17 covers a further fixed wheel 20, which is engaged with an idler 21 of shaft 5. This idler 21 can be connected to rotate by shift clutch 10 with shaft 5. Furthermore, fixed wheel 24' of shaft 5 with idler 29 of shaft 17, is connected by shift clutch 8 with shaft 17. The latch of shift clutch 9 causes a direction of rotation reversal of the output shaft and activates the reverse gears in connection with shift clutches 11, 12 and 13.

As the Figure shows, fixed wheel 24' of shaft 5 engages with attached fixed wheel 25' of shaft 6; idler 23 of shaft 6 engages with fixed wheel 22' of output shaft 4 and is connected by shift clutch 11 with shaft 6. Furthermore, fixed wheel 25' of shaft 6 engages with idler 27' of output shaft 4, which is connected by shift clutch 12 with the output shaft and is engaged with fixed wheel 26 of shaft 7. In addition, idler 30 of shaft 7 engages with fixed wheel 22' of output shaft 4, which additionally engages with an idler 32 of the front wheel drive 15.

In FIG. 2, a variant of the diagram according to FIG. 1 is shown, which exhibits a permanent front wheel drive and, in particular, is suitable for telescopic handlers. Here front and rear wheel drive on a shaft takes place, namely on drive shaft 4.

The clutch combinations for representing 6 forward gears and 3 reverse gears of the transmission, which is shown in FIGS. 1 and 2, are as follows:

| | Forward |
|---|---|
| 1. Gear | shift clutches 8 and 11 |
| 2. Gear | shift clutches 8 and 12 |
| 3. Gear | shift clutches 8 and 13 |
| 4. Gear | shift clutches 10 and 11 |
| 5. Gear | shift clutches 10 and 12 |
| 6. Gear | shift clutches 10 and 13 |

-continued

| | Reverse |
|---|---|
| 7. Gear | shift clutches 9 and 11 |
| 8. Gear | shift clutches 9 and 12 |
| 9. Gear | shift clutches 9 and 13 |

For the realization of only five or four forward gears (three reverse gears, however), two of the six forward gear clutch combinations, respectively, can be deactivated.

The basic principle of the visible kinematic diagram shows ten wheels. Adding one or more wheels can result in a wide spectrum of transmission ratios and transmission ratio spreads.

In FIGS. 3, 4, 5, 6, and 7, further diagrams with insertable front wheel drive 15 are represented, which differ from the diagrams, which have already been explained, by the number of wheels. A permanent front wheel drive is also proposed, which is similar to the example shown in FIG. 2.

Figure 4:
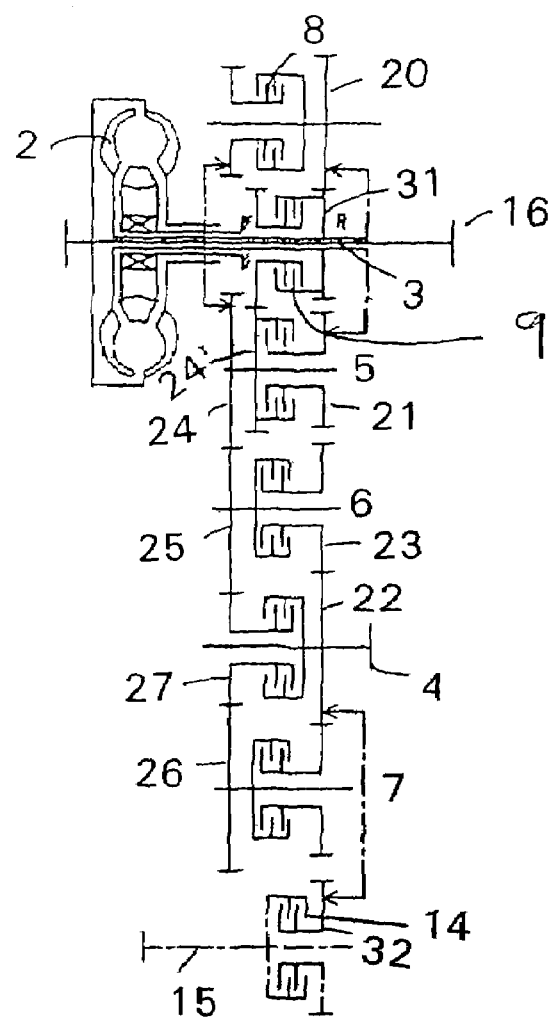

The diagram, according to FIG. 3, which is taken from the diagram in FIG. 1, shows that only on shaft 17 is an arranged, fixed wheel 20, so that the assigned idler 21 of shaft 5 of shift clutch 10 engages with this (another transmission ratio can be reached with the additional fixed wheel in FIG. 1); in FIG. 4, the output shaft 4 exhibits a fixed wheel 22, which couples with idler 23 of shaft 6 and is no longer with shift clutch 12; likewise, shafts 5 and 6 from shift clutches 10 and 11 respectively, exhibit independent fixed wheels 24, 25 (here, shaft 5 covers two fixed wheels 24, 24'). In addition, fixed wheel 26 is on shaft 7 and is independently trained of shift clutch 13, as well as connected to idler 27 of output shaft 4.

Figure 5:
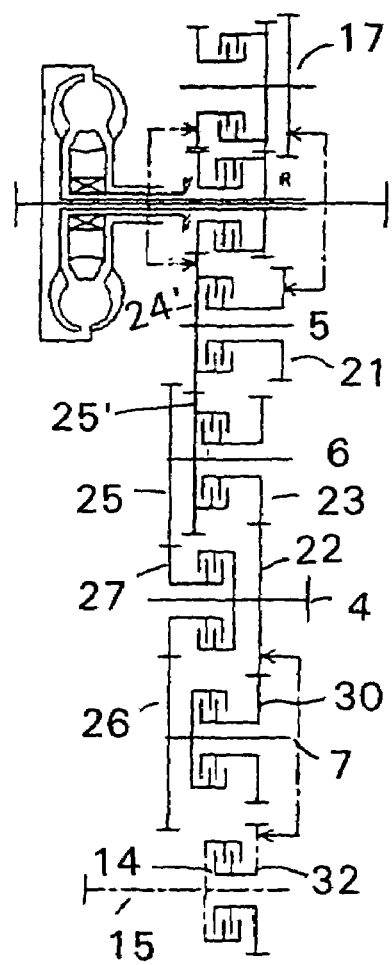

According to FIG. 5, two fixed wheels 25, 25' on shaft 6 is proposed, whereby the fixed wheel 25 is connected to shaft 4 (idler 27), and idler 25' is connected to shaft 5 (fixed wheel 24').

Figure 6:
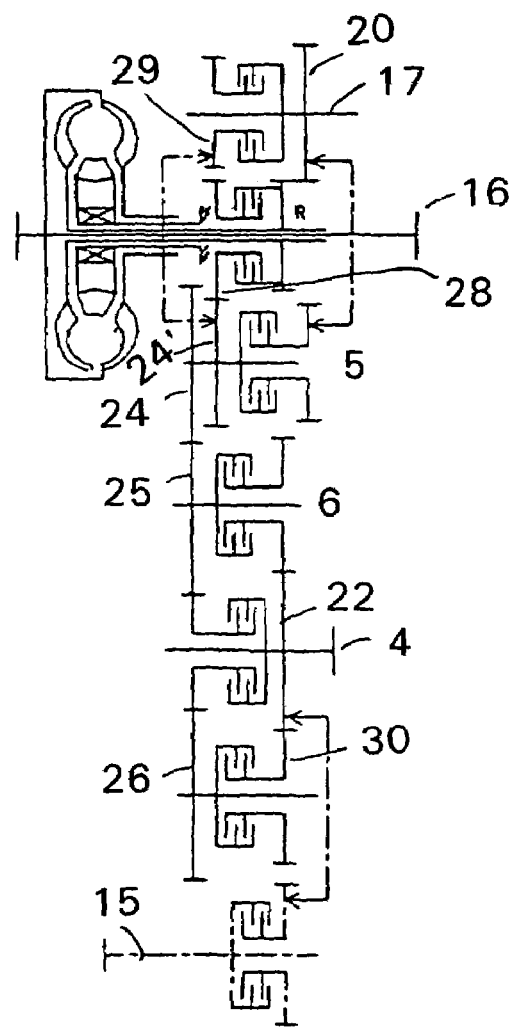

The example shown in FIG. 6 differs from the diagram in FIG. 1 in that shaft 5 covers two fixed wheels 24, 24', whereby fixed wheel 24 is connected to fixed wheel 25 of shaft 6, and fixed wheel 24' is connected to idler 29 of shaft 17 and with idler 28 of shaft 3. Furthermore, fixed wheel 25 of shaft 6 is not coupled with shift clutch 11, fixed wheel 22 of shaft 4 is not coupled with shift clutch 12, and fixed wheel 26 of shaft 7 is not coupled with shift clutch 13.

Figure 7:
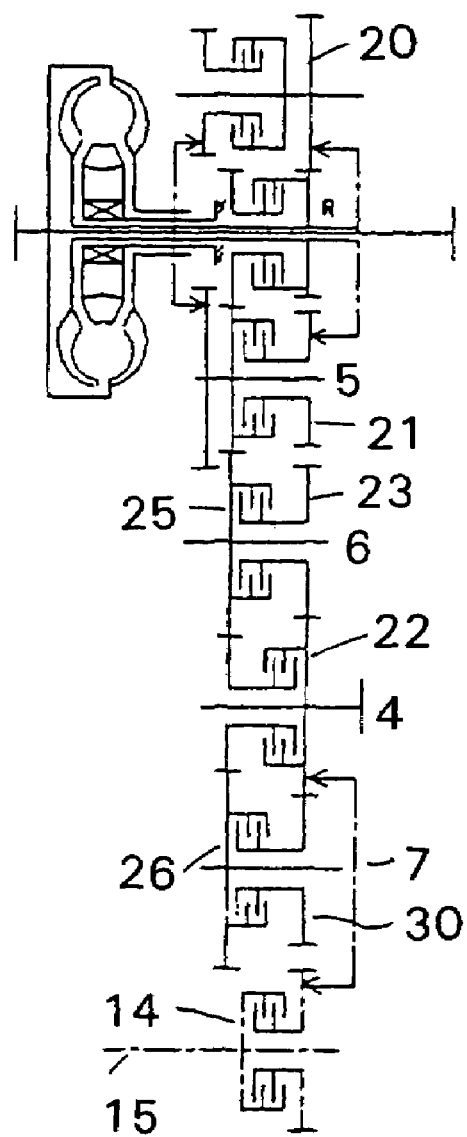

The example according to FIG. 7 differs from the diagram of FIG. 4 in that fixed wheels 25 and 22 respectively, of shafts 6 and 4, are connected to shift clutches 11 and 12, respectively; likewise, fixed wheel 26 of shaft 7 is connected to shift clutch 13.

Figure 8:
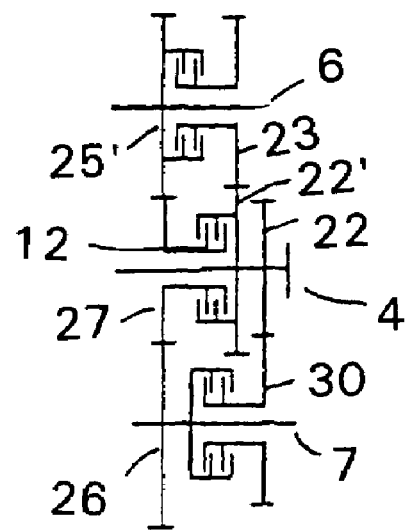
FIG. 8 a variant of the connection of the output shaft with the two neighboring jack shafts in accordance with this invention.

In FIG. 8, a further variant of the connection of output shaft 4 with shafts 6 and 7 is represented, in which shaft 4 exhibits two fixed wheels 22, 22', whereby fixed wheel 22 is connected to idler 30 of shaft 7, and fixed wheel 22' is connected to idler 23 of shaft 6. Furthermore, idler 27 of shaft 4 can be connected to fixed wheel 26 of shaft 7 and fixed wheel 25' of shaft 6 by shift clutch 12.

Figure 9:
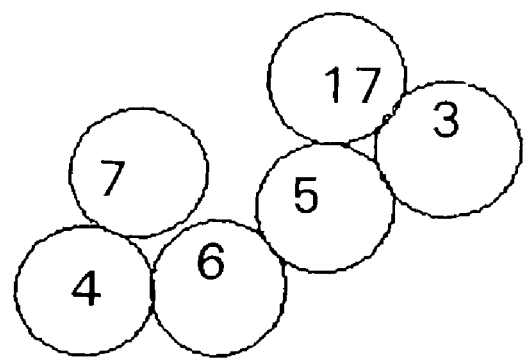

FIG. 9 illustrates a possibility of the positioning of shafts with a lateral installation regarding a telescopic handler. As has already been explained, shaft 7 can be rotated around output shaft 4, as shafts 17 and 5 can be rotated around drive shaft 3.

Figure 10A:
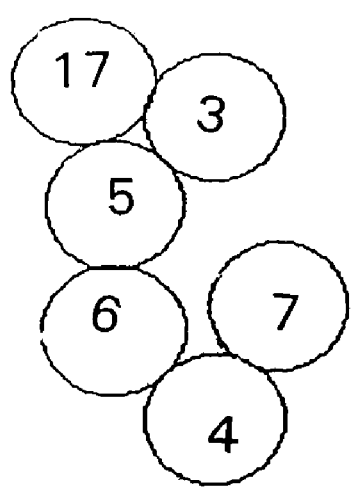
Figure 10B:
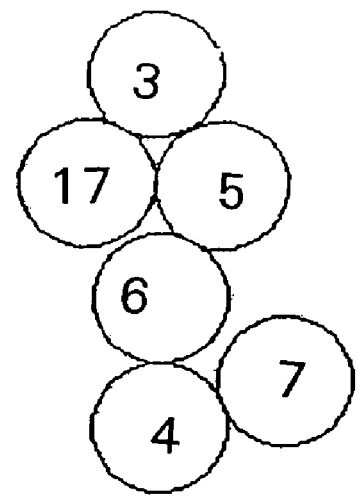

In FIGS. 10A and 10B, two possibilities of a centric installation with a telescopic handler are shown. Also, here shaft 7 can be rotated around output shaft 4; likewise, shafts 17 and 5 can be rotated around drive shaft 3.

FIGS. 11A, 11B, 11C and 11D show four variants of shaft arrangement regarding an excavator loader with insertable front wheel drive (shaft) 15. It becomes clear here that shafts 15 (front wheel drive) and 7 can be rotated around output shaft 4; shafts 17 and 5 can rotate around drive shaft 3, so that a very high installation flexibility is ensured.

In the framework, which is not further represented by the diagrams, the possibility exists of creating a transmission with four forward gears and two reverse gears by removing an entire shaft.

The possibility also exists that front wheel drive shaft 15 is arranged over a fixed wheel (not shown) with idler 23 or jack shaft 6.

| Reference numerals |
|---|
| 1 transmission |
| 2 converter |
| 3 drive shaft |
| 4 output shaft |
| 5 jack shaft |
| 6 jack shaft |
| 7 jack shaft |
| 8 shift clutch |
| 9 shift clutch |
| 10 shift clutch |
| 11 shift clutch |
| 12 shift clutch |
| 13 shift clutch |
| 14 shift clutch |
| 15 front wheel drive shaft |
| 16 PTO |
| 17 jack shaft |
| 20 fixed wheel |
| 20' fixed wheel |
| 21 idler |
| 22 fixed wheel |
| 22' fixed wheel |
| 23 idler |
| 24 fixed wheel |
| 24' fixed wheel |
| 25 fixed wheel |
| 25' fixed wheel |
| 26 fixed wheel |
| 26' fixed wheel |
| 27 fixed wheel |
| 27' fixed wheel |
| 28 idler |
| 29 idler |
| 30 idler |
| 31 fixed wheel |
| 32 idler |

The invention claimed is:

1. A multi-geared power shift transmission for a construction machine providing improved installation flexibility, the transmission comprising:
   a torque converter (2);
   a drive shaft (3) being drivingly coupled to the torque converter (2);
   a first counter shaft (5);
   a second counter shaft (6);
   a third counter shaft (7);
   a fourth counter shaft (17); and
   an output shaft (4) for supplying driving power;
   and each of the drive shaft (3), the output shaft (4), the first counter shaft (5), the second counter shaft (6), the third counter shaft (7) and the fourth counter shaft (17) having a gear unit comprising at least one fixed gear wheel, an idler gear wheel and a shift clutch (8, 9, 10, 11, 12, 13) for coupling the idler gear wheel to the respective shaft such that up to six forward gear ratios and three reverse gear ratios can be engaged;

the gear unit of the drive shaft (3) is only directly drivingly engagable with the gear unit of the first counter shaft (5) and the gear unit of the fourth counter shaft (17);

the gear unit of the first counter shaft (5) is only directly drivingly engagable with the gear unit of the drive shaft (3), the gear unit of the fourth counter shaft (17) and the gear unit of the second counter shaft (6);

the gear unit of the second counter shaft (6) is only directly drivingly engagable with the gear unit of the first counter shaft (5) and the gear unit of the output shaft (4);

the gear unit of the third counter shaft (7) is only directly drivingly engagable with the gear unit of the output shaft (4);

the gear unit of the fourth counter shaft (17) is only directly drivingly engagable with the gear unit of the drive shaft (3) and the gear unit of the first counter shaft (5); and the gear unit of the output shaft (4) is directly drivingly engagable with at least the gear unit of the second counter shaft (6) and the gear unit of the third counter shaft (7);

whereby that the transmission provides improved installation flexibility.

2. The multi-geared power shift transmission according to claim 1, wherein the transmission further includes a front wheel drive shaft (15) which drivingly engages with a fixed gear wheel of the gear unit of the output shaft (4) when a shift clutch (14) of the front wheel drive shaft (15) is engaged.

3. The multi-geared power shift transmission according to claim 2, wherein the front wheel drive shaft (15) is permanently coupled to the gear unit of the output shaft (4) so that the output shaft (4) provides both front wheel and rear wheel drive.

4. The multi-geared power shift transmission according to claim 1, wherein at least one of the gear unit of the drive shaft (3), the gear unit of the output shaft (4), the gear unit of the first counter shaft (5), the gear unit of the second counter shaft (6), the gear unit of the third counter shaft (7) and the gear unit of the fourth counter shaft (17) has a second fixed gear wheel which provides the transmission with an increased range of transmission ratios.

5. The multi-geared power shift transmission according to claim 2, wherein the front wheel drive shaft (15) is a part time drive which is engagable, via an idler gear wheel, with the at least one fixed gear wheel of the second counter shaft (6).

6. The multi-geared power shift transmission according to claim 2, wherein the transmission includes an auxiliary drive (16) for driving additional equipment.

7. The multi-geared power shift transmission according to claim 2, wherein the transmission is incorporated into one of a telescopic handler and an excavator loader.

8. A multi-geared power shift transmission of a telescopic handler and an excavator loader which provides improved installation flexibility, the transmission comprising:

a torque converter (2);

a drive shaft (3) being drivingly coupled to the torque converter (2);

a first counter shaft (5);

a second counter shaft (6);

a third counter shaft (7);

a fourth counter shaft (17); and an output shaft (4) for supplying driving power;

and each of the drive shaft (3), the output shaft (4), the first counter shaft (5), the second counter shaft (6), the third counter shaft (7) and the fourth counter shaft (17) having a gear unit comprising at least one fixed gear wheel, an idler gear wheel and a shift clutch (8, 9, 10, 11, 12, 13) for coupling the idler gear wheel to the respective shaft such that up to six forward gear ratios and three reverse gear ratios can be engaged;

the gear unit of the drive shaft (3) is only directly drivingly engagable with the gear unit of the first counter shaft (5) and the gear unit of the fourth counter shaft (17);

the gear unit of the first counter shaft (5) is only directly drivingly engagable with the gear unit of the drive shaft (3), the gear unit of the fourth counter shaft (17) and the gear unit of the second counter shaft (6);

the gear unit of the second counter shaft (6) is only directly drivingly engagable with the gear unit of the first counter shaft (5) and the gear unit of the output shaft (4);

the gear unit of the third counter shaft (7) is only directly drivingly engagable with the gear unit of the output shaft (4);

the gear unit of the fourth counter shaft (17) is only directly drivingly engagable with the gear unit of the drive shaft (3) and the gear unit of the first counter shaft (5); and the gear unit of the output shaft (4) is directly drivingly engagable with at least the gear unit of the second counter shaft (6) and the gear unit of the third counter shaft (7);

whereby that the transmission provides improved installation flexibility; and an auxiliary drive (16), for driving additional equipment, extends through the drive shaft (3).

9. The multi-geared power shift transmission according to claim 8, wherein the transmission further includes a front wheel drive shaft (15) which drivingly engages with a fixed gear wheel of the gear unit of the output shaft (4) when a shift clutch (14) of the front wheel drive shaft (15) is engaged.

10. The multi-geared power shift transmission according to claim 9, wherein the front wheel drive shaft (15) is permanently coupled to the gear unit of the output shaft (4) so that the output shaft (4) provides both front wheel and rear wheel drive.

11. The multi-geared power shift transmission according to claim 8, wherein at least one of the gear unit of the drive shaft (3), the gear unit of the output shaft (4), the gear unit of the first counter shaft (5), the gear unit of the second counter shaft (6), the gear unit of the third counter shaft (7) and the gear unit of the fourth counter shaft (17) has a second fixed gear wheel which provides the transmission with an increased range of transmission ratios.

12. The multi-geared power shift transmission according to claim 9, wherein the front wheel drive shaft (15) is a part time drive which is engagable, via an idler gear wheel, with the at least one fixed gear wheel of the second counter shaft (6).

13. A multi-geared power shift transmission for a construction machine providing improved installation flexibility, the transmission comprising:

a torque converter (2);

a drive shaft (3) being drivingly coupled to the torque converter (2);

a first counter shaft (5, 6, 7);

a second counter shaft (5, 6, 7);

a subsequent counter shaft (17); and an output shaft (4) for supplying driving power;

and each of the drive shaft (3), the output shaft (4), the first counter shaft (5, 6, 7), the second counter shaft (5, 6, 7), the subsequent counter shaft (17) having a gear unit comprising at least one fixed gear wheel, an idler gear wheel and a shift clutch (8, 9, 10, 11, 12, 13) for coupling the idler gear wheel to the respective shaft such that four forward gear ratios and two reverse gear ratios can be engaged;

the gear unit of the drive shaft (3) is only directly drivingly engagable with the gear unit of the first counter shaft (5, 6, 7) and the gear unit of the subsequent counter shaft (17);

the gear unit of the first counter shaft (5, 6, 7) is only directly drivingly engagable with the gear unit of the drive shaft (3), the gear unit of the subsequent counter shaft (17) and the gear unit of the second counter shaft (5, 6, 7);

the gear unit of the second counter shaft (5, 6, 7) is only directly drivingly engagable with the gear unit of the first counter shaft (5, 6, 7) and the gear unit of the output shaft (4);

the gear unit of the subsequent counter shaft (17) is only directly drivingly engagable with the gear unit of the drive shaft (3) and the gear unit of the first counter shaft (5, 6, 7); and the gear unit of the output shaft (4) is directly drivingly engagable with at least the gear unit of the second counter shaft (5, 6, 7).

* * * * *